United States Patent
Gyulai

(10) Patent No.: US 12,506,218 B2
(45) Date of Patent: Dec. 23, 2025

(54) CELL HOUSING ELEMENT FOR A BATTERY CELL, MOTOR VEHICLE, AND METHOD FOR PRODUCING A CELL HOUSING ELEMENT

(71) Applicant: AUDI AG, Ingolstadt (DE)

(72) Inventor: Tamas Gyulai, Pfaffenhofen an der Ilm (DE)

(73) Assignee: AUDI AG, Ingolstadt (DE)

( * ) Notice: Subject to any disclaimer, the term of this patent is extended or adjusted under 35 U.S.C. 154(b) by 509 days.

(21) Appl. No.: 18/074,914

(22) Filed: Dec. 5, 2022

(65) Prior Publication Data

US 2023/0187770 A1  Jun. 15, 2023

(30) Foreign Application Priority Data

Dec. 9, 2021  (DE) .......................... 102021132478.5

(51) Int. Cl.
 *H01M 50/103* (2021.01)
 *B60R 16/033* (2006.01)
 *H01M 50/186* (2021.01)
 *H01M 50/342* (2021.01)

(52) U.S. Cl.
 CPC ....... *H01M 50/3425* (2021.01); *B60R 16/033* (2013.01); *H01M 50/103* (2021.01); *H01M 50/186* (2021.01); *H01M 2200/20* (2013.01); *H01M 2220/20* (2013.01)

(58) Field of Classification Search
 CPC .... H01M 50/30; H01M 50/35; H01M 50/308; H01M 50/342; H01M 50/3425; H01M 50/358; H01M 50/367; H01M 50/394; H01M 50/375; H01M 2200/10; H01M 2200/20; F16K 17/403
 See application file for complete search history.

(56) References Cited

U.S. PATENT DOCUMENTS

| | | | | |
|---|---|---|---|---|
| 4,664,287 A | * | 5/1987 | Wilson | F16K 17/16 220/DIG. 27 |
| 2005/0282064 A1 | * | 12/2005 | Kim | H01M 50/3425 454/339 |
| 2012/0000548 A1 | * | 1/2012 | Khamitkar | F16K 17/1606 137/68.25 |
| 2016/0293926 A1 | | 10/2016 | Yamada | |
| 2017/0170439 A1 | * | 6/2017 | Jarvis | H01M 50/578 |
| 2020/0365858 A1 | | 11/2020 | Jaspers et al. | |

FOREIGN PATENT DOCUMENTS

| | | |
|---|---|---|
| DE | 102018120380 A1 | 2/2019 |
| DE | 102019216968 A1 | 5/2021 |

OTHER PUBLICATIONS

Search Report issued on Sep. 2, 2022, in corresponding German Application No. 102021132478.5; 14 pages.

* cited by examiner

*Primary Examiner* — Kaj K Olsen

(74) *Attorney, Agent, or Firm* — Maier & Maier, PLLC

(57) ABSTRACT

A cell housing element for a battery cell of a motor vehicle battery. The cell housing element has a cell housing wall, which contains a degassing opening penetrating the cell housing wall in a first direction, and a closure element with a bursting membrane, which is arranged on the cell housing wall so that it completely covers the degassing opening. The cell housing element has a seal which is arranged between the closure element and the cell housing wall, circumferentially around the degassing opening.

20 Claims, 2 Drawing Sheets

CELL HOUSING ELEMENT FOR A BATTERY CELL, MOTOR VEHICLE, AND METHOD FOR PRODUCING A CELL HOUSING ELEMENT

FIELD

The invention relates to a cell housing element for a battery cell of a motor vehicle battery, wherein the cell housing element has a cell housing wall, which contains a degassing opening penetrating the cell housing wall in a first direction, and a closure element with a bursting membrane, which is arranged on the cell housing wall so that it completely covers the degassing opening. Furthermore, the invention also relates to a motor vehicle and a method for producing a cell housing element.

BACKGROUND

A cell housing element represents at least part of a cell housing for a battery cell of a motor vehicle battery. Battery cells for motor vehicles, in particular for high-voltage batteries, which battery cells are known from the prior art, can have different configurations. For example, there are prismatic battery cells in which the cell poles or cell terminals are typically arranged on the upper side of the cell, and a so-called vent element of the cell is located between the cell terminals, which vent element is also referred to here as a closure element. This vent element can be designed with a bursting membrane which closes an opening in the cell housing. In the event of overpressure in the cell, for example in the case of a thermal event, i.e. thermal runaway of the cell, this vent element opens, for example by rupturing, and the gas can escape from the cell through the opening.

For example, US 2016/0293926 A1 describes a cell housing of a battery cell with a relief valve, which is arranged on a side of the prismatic cell on which the cell terminals are not arranged, in particular on a side opposite the cell terminals. The relief valve can be designed as a predetermined breaking point in a wall of the cell housing, in particular in the form of a corresponding groove that extends linearly or circularly, or in the form of a thin-walled region of the cell wall.

However, this complicates the design of the cell housing side with the predetermined breaking point, since the cell housing side, especially if it is designed as an underside, should be designed with significantly thicker walls, except for the region with the predetermined breaking point providing the relief valve. The provision of a cell housing wall with different thicknesses, however, is relatively complex and expensive in terms of manufacturing technology. In principle, such a relief valve should meet a wide variety of requirements. The relief valve should be as easy as possible to open if gas is to be discharged from the cell, but it should also be as robust as possible against external influences, and it should also be easy and inexpensive to provide.

SUMMARY

The object of the present invention is to provide a cell housing element, a motor vehicle, and a method which enable a cell housing to be designed as simply and cost-effectively as possible and which also increase the possible uses for a battery cell in a safe manner.

In this case, the cell housing element according to the invention for a battery cell of a motor vehicle battery has a cell housing wall, which contains a degassing opening penetrating the cell housing wall in a first direction, and a closure element with a bursting membrane, which is arranged on the cell housing wall so that it completely covers the degassing opening. The cell housing element in this case has a seal which is arranged between the closure element and the cell housing wall, circumferentially around the degassing opening.

The invention is based on several findings: On the one hand, a separately provided closure element, which is connected to the cell housing wall, in contrast to the design as a failure point or predetermined breaking point of the cell housing wall itself, enables significantly more flexibility and freedom with regard to an optimized design of the cell housing wall, for example with regard to the thickness thereof, regardless of the design of the closure element, which therefore enables significantly simpler and more cost-effective manufacturing processes for producing the cell housing for a battery cell with such a cell housing element, as well as more flexibility and freedom with regard to an optimized design of the closure element, which provides the vent element mentioned at the outset, which can thus be designed, e.g., in a simple manner with an especially thin bursting membrane, which enables a release of the degassing opening accordingly, even with small bridges in the cell. Furthermore, the invention is based on the finding that discharging a gas escaping from a battery cell in a direction pointing away from the passenger compartment with respect to the intended installation position of the cell housing element in a motor vehicle provides significantly more safety for occupants. In other words, it has proven to be very advantageous to arrange battery cells of a motor vehicle battery in the motor vehicle, in particular in an underbody region of the motor vehicle, in such a way that the closure element with the bursting membrane is arranged on an underside of the respective cells to provide a degassing option for the cells in question and thus, for example, in the direction of the underrun protection of the motor vehicle and away from a passenger compartment. However, this in turn brings with it other challenges: Due to the degassing opening on the underside, increased caution is then required with regard to the penetration of liquid into the cell. In conventional cells, in which the vent element described at the outset is arranged on the top surface of the cell, even scenarios in which a great deal of water or salt water, as is the case in certain tests, penetrates into the battery housing and stays there for several hours are uncritical, because, with vent elements arranged at the top, the entry of liquid into the battery housing would have to be so large that the liquid would have to flood the cell up to the top edge in order to even penetrate the cell through such a vent element. In such a case, the damage to the battery would be extensive anyway. The occurrence of such a fault is very unlikely and therefore a seal for sealing such a vent element was not required until now. Since the cell housing element according to the invention now has a seal which is arranged between the closure element and the cell housing wall circumferentially around the degassing opening, it now advantageously makes it possible to arrange a battery cell in the motor vehicle in a safe manner in such a way that the degassing opening is directed downwards. Even if water penetrates, it can now be ensured with a significantly higher probability that water cannot get into the interior of the cell through the degassing opening. Although the closure element can be arranged on the cell housing wall by means of an essentially tight connection technique, for example welding, it has been shown that, due to the fact that cells are typically always in motion during operation and breathe or are subject to so-called swelling, small cracks, through which water or other liquids could in principle penetrate into the cell, can very easily appear in such a connection over time. A seal can now advantageously significantly reduce the risk of water penetration. This can advantageously significantly increase the possible uses of the battery cell, which comprises the cell housing element, since safe operation of the cell can now be guaranteed even if the degassing opening with the closure element is arranged on the underside, and an extremely simple and cost-effective design of a cell housing is enabled with such a cell housing element at the same time.

For example, one side of a cell housing of the battery cell can be provided by the cell housing element or also several such sides of a cell housing. In particular, the cell housing wall can provide one or more such sides of a cell housing for a battery cell. The cell housing of a battery cell, for example a prismatic cell, can be composed of several separately manufactured and provided cell housing elements, which are assembled in a subsequent step. For example, such a cell housing can have, in addition to the cell housing element, for example a housing cover with one or two cell pole taps or cell terminals arranged thereon. The first direction in this case is essentially oriented locally perpendicular to the cell housing wall at the location of the degassing opening. The closure element here can be designed in one piece, e.g. designed only as a bursting membrane, or it can also be designed in several pieces and, for example, have other elements in addition to the bursting membrane, for example a protective element and/or have a type of frame on which the bursting membrane is arranged, in which case the frame can be designed with a thicker wall than the bursting element, for example. The reason for this is that a bursting membrane is typically very thin, for example with a thickness of less than 1 millimeter, for example in the range of approx. 0.1 millimeter on average, wherein the bursting membrane is also able to have a predetermined breaking point or embossing or indentation, which is even thinner. The arrangement on the cell housing wall is thus possible in a more robust manner thanks to a thicker frame part. Such a frame and the bursting membrane can also be designed in one piece or produced from one piece and have the same wall thickness or material thickness.

The closure element is also arranged on the cell housing wall so that it completely covers the degassing opening in such a way that the closure element extends further, in all directions perpendicular to the first direction, than the degassing opening itself. The closure element also extends, so to speak, to an edge region of the cell housing wall surrounding the degassing opening and can be arranged, for example, on the cell housing wall in this edge region. The seal is then preferably also arranged correspondingly in this edge region. The seal itself is preferably made of plastic, since this enables the seal to be made sufficiently elastic enough to achieve a good sealing effect. Various design options are possible for the seal itself. The seal can be designed, for example, as a solid seal, for example as a sealing ring or O-ring, but preferably with a geometry other than a circular one, preferably with an angular geometry. However, the seal can also be provided as a curable sealing compound which is applied, in the non-solid state, to the region of the cell housing wall and/or of the sealing element to be sealed, during manufacture of the cell housing. The closure element is then arranged as intended on the cell housing wall and connected to the cell housing wall, and the seal then cures. In any case, the seal is arranged and formed around the degassing opening in such a way that the seal extends along a closed line around the degassing opening. The seal in this case has contact with both the cell housing wall and the closure element. The seal thus connects the cell housing element and the closure element to one another in a sealing manner.

The cell housing wall and the closure element, in particular the bursting membrane, are preferably made of metallic material, preferably aluminum. In addition to the bursting membrane, the closure element can also comprise other elements, which can optionally also be made of a non-metallic material, as will be described in more detail later.

The cell housing wall may have a thickness between 1 millimeter and 2 millimeters, for example 1.2 millimeters. This means that the cell housing wall is significantly thicker than the bursting membrane. The bursting membrane can also be designed with a predetermined breaking point. In other words, the bursting membrane does not have to have a constant thickness, but can, for example, also be weakened locally by a groove or scoring. This enables the degassing opening to be opened reliably.

In a further advantageous embodiment of the invention, the cell housing element has a connecting means which connects the closure element to the cell housing wall along a closed connecting contour which is arranged circumferentially around the degassing opening and in particular also the seal. In relation to an axis extending centrally through the degassing opening and aligned parallel to the first direction, such a connection contour therefore preferably extends radially outside of the seal. This also protects the seal from environmental influences and thus provides additional protection against the ingress of liquid into the cell. If, for some reason, liquid does get through this connection, it is advantageously prevented from getting into the degassing opening by the existing seal. In this case, the connecting means is designed separately from the seal. This enables a more robust connection between the closure element and the cell housing wall.

The connecting means is preferably designed as a weld seam. In other words, the connecting means represents a weld seam in this case. A welded connection between the cell housing wall and the closure element represents an extremely advantageous, robust, and additionally sealing connection option at the same time. In the event that the weld seam should crack over the course of the life of the battery cell due to mechanical stress, the additional seal can then advantageously ensure that liquid cannot get into the cell so easily. The weld can be produced, for example, at the edge of the closure element with respect to the radial seal defined above and the underlying cell housing wall with respect to the first direction.

Alternatively, however, it is also possible to design the connecting means differently. For example, an embossing between the closure element and the cell housing wall is also an option. Gluing can also be used as the connecting means. In this case, the seal itself can optionally also function as an adhesive, for example if the seal is provided as a curable, non-solid compound, as described above, and is introduced between the cell housing wall and the closure element. In other words, the seal itself can also represent the connecting means.

An adhesive connection or a connection by embossing between the cell housing wall and the closure element is particularly advantageous when the connection point is in a position that is difficult to access. If, on the other hand, the closure element is arranged on the outside of the cell housing wall, it is preferable for the connecting means to be the weld seam. Outside here means that this outer side is on a side of the cell housing wall facing away from the cell interior when the cell housing element is used as intended as part of a cell housing of a battery cell.

It is, furthermore, preferred that the cell housing element is designed to enclose an interior space, wherein the closure element is arranged on a side of the cell housing wall facing away from the interior space. The cell housing element can be designed, for example, as a housing cup, which is supplemented by a corresponding housing cover that provides a side wall for the cell housing. However, the cell housing element is preferably designed as a hollow profile. This has advantages that will be explained in more detail later. In any case, the cell housing element encloses an interior space according to a design geometry. This interior space can then be open on at least one side, preferably on two opposite sides, which can be closed with corresponding cell housing covers. Furthermore, the closure element is then preferably arranged on the outside with respect to this interior space. This has the great advantage that the production of the cell housing element is significantly simplified since the outside region is significantly easier to access. This makes it possible, for example, to carry out the connection between the closure element and the cell housing wall as a welded connection.

Nevertheless, it is also conceivable that the cell housing element is designed to enclose an interior space and the closure element is arranged on a side of the cell housing wall that faces the interior space. In this case, the connection point between the closure element and the cell housing wall is therefore realized on the inside, within the interior space. This has the advantage that the closure element can be arranged in a somewhat more protected position.

As already mentioned, a further advantageous embodiment of the invention is represented when the cell housing element is designed as a hollow profile. This enables a particularly simple and cost-effective design of the cell housing element, which can then be provided simply as an extruded profile, for example, which is provided with a degassing opening in which a corresponding closure element is then arranged. In this case, the cell housing element is thus open on two opposite sides. To provide a housing, these two sides are closed by appropriate housing covers. It is, furthermore, preferred that the cell poles of the battery cell comprising this cell housing are provided on these two opposite sides. Accordingly, only one such cell pole is then arranged on a respective side. This has numerous great advantages. On the one hand, because the degassing opening is not arranged on the same side as a cell pole, a significantly simpler separation can be provided between the high-voltage path and the gas escaping from the cell in question in case of a thermal event. Furthermore, cooling for the battery cell on both sides can be implemented in a particularly simple manner, which can then be implemented, for example, on the side with the closure element and on the opposite side, on which there are then likewise no cell poles. To provide the cell housing, the covers described can then, for example, simply be welded to the cell housing element on both sides, in particular after the inner workings of the cell interior have been placed in the cell housing. The electrolyte can also be filled later through an opening in the cell housing.

In a further very advantageous embodiment of the invention, a groove surrounding the degassing opening is arranged in the housing wall, in which groove the seal is arranged in a recessed manner. This has the advantage that the distance between the closure element and the housing wall can be reduced. In other words, the gap that develops in the connection region between the closure element and the housing wall as a result of the introduction of the seal can be significantly reduced by arranging the seal in such a circumferential groove. In addition, the closure element can also rest on the housing wall in the connection region, which has a supporting effect and makes the closure element more robust against damage from external mechanical influences. This thus promotes the stability of the arrangement of the closure element on the housing wall and also has a positive effect on the sealing. Such a groove can be realized in a particularly simple manner if the closure element is arranged on the outside of the cell housing wall, i.e. on a side facing away from the interior space defined above.

In a further advantageous embodiment of the invention, the closure element has a support flange region, which is arranged in an edge region surrounding the opening on a first side of the cell housing wall and has an edge facing the degassing opening, and a collar arranged on the edge, which collar protrudes from the support flange region and into the degassing opening as relates to the first direction with an end face that faces away from the support flange region, on which end face the bursting membrane is arranged, in particular wherein the closure element has a membrane protection element that is arranged on the collar in front of the bursting membrane in relation to the first direction and at a distance from the bursting membrane in relation to the first direction. The support flange region and possibly also the collar can, for example, be designed with a significantly greater wall thickness than the bursting membrane. This facilitates the attachment of the closure element to the cell housing wall. A design with the same wall thickness is also conceivable. The division of the closure element into the sections mentioned, namely the support flange region, the collar, and the bursting membrane, primarily serves to better describe the geometry of the closure element and does not necessarily imply that these components are provided separately and joined together. These sections can also be designed in one piece.

The design of the closure element described above enables the bursting membrane to be set back in the direction of the interior space enclosed by the cell housing element. This is very advantageous since, due to its very thin design, the bursting membrane can easily tear due to external mechanical influences. Due to the set-back arrangement, the bursting membrane is correspondingly better protected against such external mechanical influences.

In addition, the bursting membrane can be protected by the membrane protection element described. This protection element is preferably made of plastic and can, for example, be clipped or inserted into an inner region enclosed by the collar or otherwise arranged on and attached to the collar. For example, if you look at the closure element with respect to the first direction, especially if it is arranged on the outside of the cell housing element, the membrane protection element completely covers the view of the bursting membrane. This provides maximum protection for the bursting membrane. It would also be conceivable that the membrane protection element does not completely cover the view of the bursting membrane, but only partially. In other words, the bursting membrane does not have to be completely covered by the membrane protection element. In this case, too, the risk of touching the bursting membrane with a finger or another assembly tool when assembling the battery cell and thereby damaging it is reduced by the membrane protection element located in front thereof. The closure element in this case can be prefabricated with the membrane protection element and the other components described and, in the finished state, can be arranged as described accordingly on the degassing opening of the housing wall of the cell housing element.

As described, it is also conceivable for the closure element to be arranged on the inside, i.e. in the interior space which is enclosed by the cell housing element. In this case, for example, the membrane protection element can also be dispensed with, since the bursting membrane is arranged on the inside anyway and is therefore much better protected against contact here.

Furthermore, a cell housing with a cell housing element according to the invention or an embodiment thereof should also be regarded as part of the invention. Such a cell housing can be designed as already described above.

Furthermore, a battery cell with a cell housing element, in particular with the cell housing according to the invention or an embodiment thereof, should also be regarded as part of the invention. Such a battery cell can also be designed as already described above. The battery cell is preferably designed as a prismatic cell. Accordingly, the cell housing has an essentially cuboid geometry. The cell housing and correspondingly also the cell housing element can have a length in a second direction perpendicular to the first direction, a width in a third direction perpendicular to the first and second direction, and a height in the first direction. The length represents the largest dimension of the cell housing element, and the width represents the smallest dimension.

Furthermore, a battery with a battery cell according to the invention or one of the embodiments thereof should also be regarded as part of the invention. Such a battery can be designed, for example, as a high-voltage battery for a motor vehicle. Furthermore, such a battery can comprise a plurality of such battery cells, which are arranged next to one another, for example in the form of a row of cells, in particular with regard to the third direction defined above. Optionally, the battery cells can also be combined into battery modules and have a separate module housing; or, alternatively, the rows of cells or stacks of cells formed in this way can also be introduced directly into an overall battery housing. The battery can therefore also comprise a battery housing in which the battery cells are arranged.

Furthermore, the invention also relates to a motor vehicle with a battery cell, which comprises a cell housing with a cell housing element according to the invention or one of the embodiments thereof. The battery cell can also be designed as already described above.

It is, furthermore, preferred that the battery cell is arranged in the motor vehicle in such a way that the closure element is arranged on an underside of the battery cell with respect to a vertical axis of the vehicle. Furthermore, the battery comprising the battery cell, in particular a high-voltage battery, which can also be designed as already described above, is arranged in an underbody region of the motor vehicle. Accordingly, the closure element of the battery cell then faces away from a passenger compartment of the motor vehicle. This can significantly increase the safety of the occupants in the event of thermal runaway of a battery cell.

Furthermore, the invention also relates to a method for producing a cell housing element for a battery cell of a motor vehicle battery, wherein a cell housing wall is provided, in which a degassing opening penetrating the cell housing wall in a first direction is arranged, a closure element with a bursting membrane is provided, and the closure element is attached in such a way that the cell housing wall is arranged so that the closure element completely covers the degassing opening. Furthermore, a seal is arranged between the closure element and the cell housing wall, circumferentially around the degassing opening.

The advantages described with reference to the cell housing element according to the invention and the embodiments thereof thus apply similarly to the method according to the invention.

The seal is preferably arranged before the closure element is arranged on the cell housing wall. If the seal is designed, for example, as a solid seal, for example as a sealing ring, the seal is preferably first arranged on the cell housing wall, for example in the groove described above, and then the closure element is arranged on the cell housing wall such that the seal of the closure element has contact with the cell housing wall and seals them off from one another at the same time, and then the closure element can be connected to the cell housing wall, for example by welding. However, the seal can also be applied, as a non-solid sealing compound in a pasty or viscous state, either to the cell housing wall surrounding the degassing opening or additionally or alternatively to the closure element, for example to the support flange region thereof described above, and then the closure element can be arranged on the cell housing wall, and the seal is cured. Furthermore, a connection can be produced between the closure element and the cell housing wall in this case too, for example by means of welding. Alternatively, in this case, for example, the seal itself can also be designed as an adhesive seal, so that the curing of the seal also creates a firm connection between the closure element and the housing wall.

The invention also comprises refinements of the method according to the invention, which have features as already described in the context of the refinements of the cell housing element according to the invention and the motor vehicle according to the invention. For this reason, the corresponding refinements of the method according to the invention are not described again here.

The motor vehicle according to the invention is preferably designed as an automobile, in particular as a passenger car or truck, or as a passenger bus or motorcycle.

The invention also comprises combinations of the features of the described embodiments. The invention thus also comprises implementations that each have a combination of the features of several of the described embodiments, unless the embodiments were described as mutually exclusive.

BRIEF DESCRIPTION OF THE FIGURES

Exemplary embodiments of the invention are described hereinafter. In the figures.

DETAILED DESCRIPTION

Figure 1:
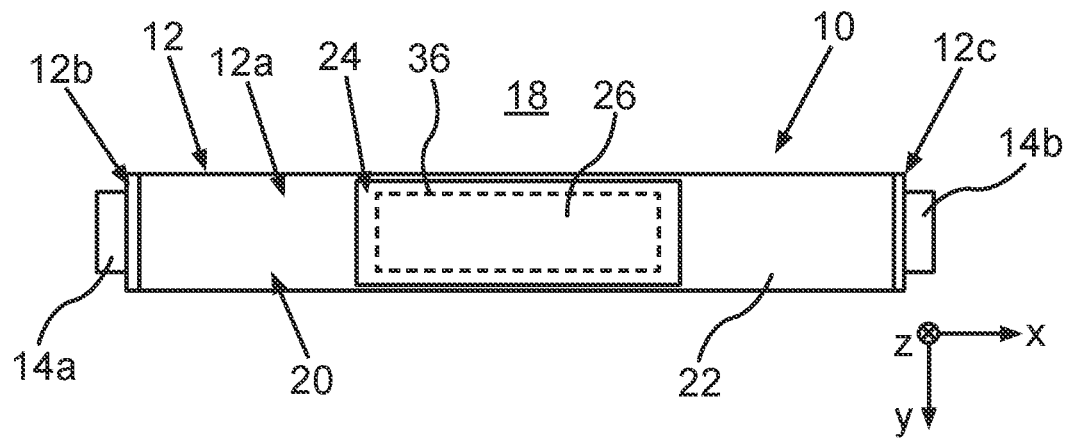
FIG. 1 shows a schematic illustration of a battery cell in a plan view from below according to an exemplary embodiment of the invention.

The exemplary embodiments explained hereinafter are preferred embodiments of the invention. In the exemplary embodiments, the described components of the embodiments each represent individual features of the invention to be considered independently of one another, which each also refine the invention independently of one another. Therefore, the disclosure is also intended to comprise combinations of the features of the embodiments other than those represented. Furthermore, the described embodiments can also be supplemented by further features of the invention as already described.

In the figures, the same reference numerals respectively designate elements that have the same function.

FIG. 1 shows a schematic representation of a battery cell 10 in a plan view from below according to an exemplary embodiment of the invention. The battery cell 10 has a cell housing 12, which can be divided into different elements. The cell housing 12 comprises a cell housing element 12a and a first end-face cover 12b and a second end-face cover 12c, wherein the two covers 12b, 12c can be firmly connected, for example welded, to the central cell housing element 12a. A cell terminal 14a, 14b of the battery cell 10 is arranged on each of the second end-face covers 12b, 12c. One of these terminals 14a, 14b is assigned to a positive pole and the other to a negative pole of the cell 10. The cell housing element 12a can be designed as a hollow profile. In this case, the cell housing 12 separates the inside of the cell, which is also referred to as the interior space 16 (see FIG. 4), from the surroundings 18 of the cell 10. The cell housing element 12a has a cell housing wall 20 which, among other things, provides a first side 22 of the battery cell 10, which represents an underside 22 of the battery cell 10 in the present case. In the present case, this underside 22 has a degassing opening 30 (compare FIGS. 2 and 4), which is closed by a closure element 24 of the cell housing element 12a. This closure element 24 has a bursting membrane 26 which ruptures in the case of a thermal event in the battery cell 10 when there is excess pressure within the cell 10 and thereby enables the cell 10 to outgas in a controlled manner.

Figure 2:
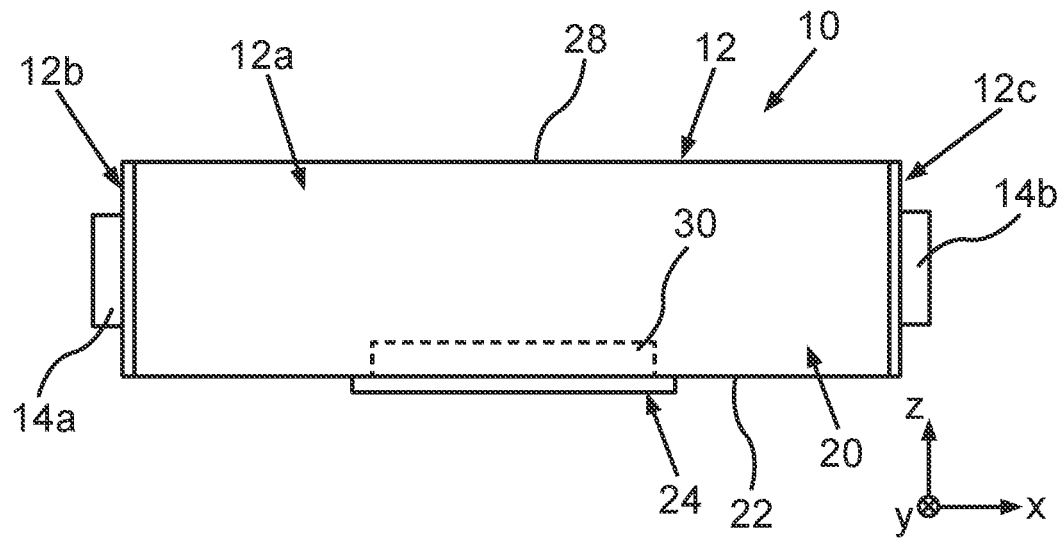
FIG. 2 shows a schematic representation of the battery cell from FIG. 1 in a side view.

FIG. 2 shows the battery cell from FIG. 1 again schematically in a side view. The upper side 28 opposite the underside 22 is also shown here with regard to the intended installation position of the cell 10 in a motor vehicle, in particular for the case in which a vehicle vertical axis pointing in the z-direction is aligned parallel to a vertical. In other words, a high-voltage battery of the motor vehicle which comprises such a cell 10 is arranged in the motor vehicle in such a way that this high-voltage battery is located in an underbody region of the motor vehicle, and the first side 22 represents an underside that faces away from a passenger compartment of the vehicle, while the upper side 28 of the cell 10 faces the passenger compartment correspondingly.

The opening 30 in the housing wall 20 which provides the underside 22 is shown by dashed lines in FIG. 2. Without the closure element 24, this degassing opening 30 thus provides a passage through the housing wall 20, which connects an exterior 18 to the interior 16 of the cell 10. The opening 30 thus penetrates the housing wall 20 on the first side 22 in the z-direction.

Figure 3:
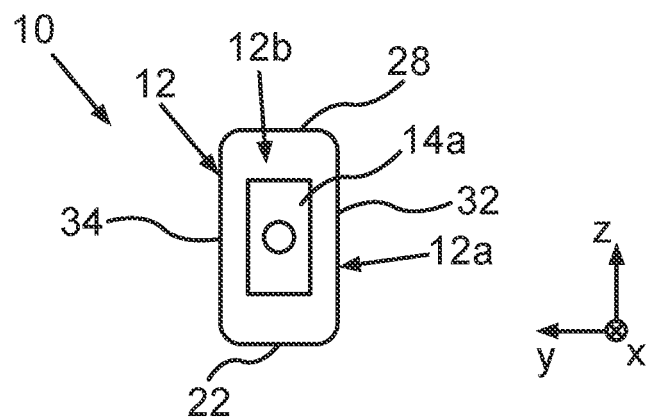
FIG. 3 shows a schematic illustration of a battery cell from FIG. 1 in a plan view of an end face with a cell pole according to an exemplary embodiment of the invention.

FIG. 3 shows a schematic representation of the battery cell 10 from FIG. 1 in a plan view of one of the end faces 12b. In particular, a front side 32 and rear side 34 delimiting the cell 10 in and counter to the y-direction can also be seen here, which represent the sides of the battery cell 10 with the largest surface region. The cell housing element 12a can provide both the front side 32 and the rear side 34, as well as the upper side 28 and underside 22 of the cell housing 12.

Figure 4:
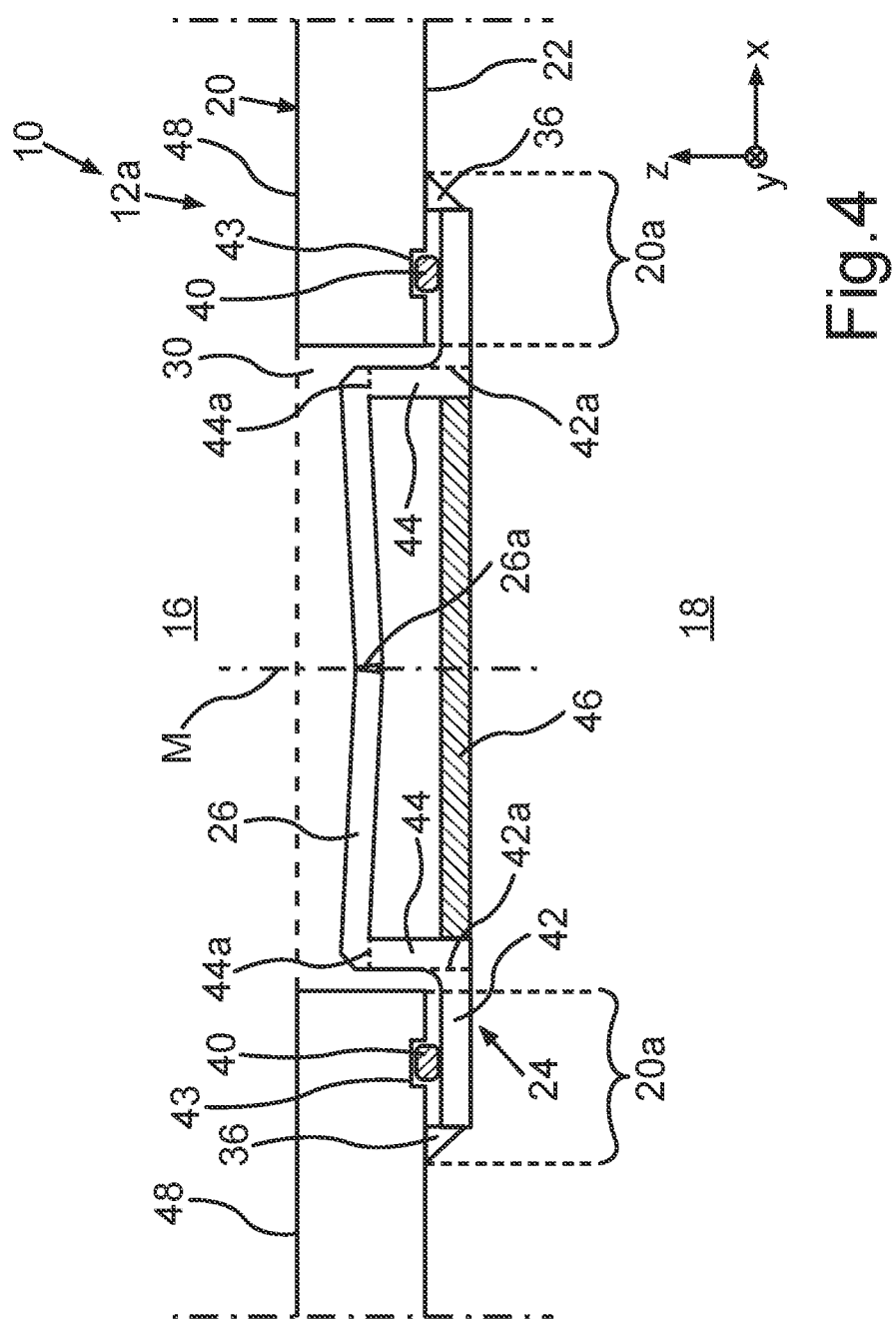
FIG. 4 shows a schematic cross-sectional representation of a cross-section through the housing wall with the cell degassing opening of the battery cell from FIG. 1 according to an exemplary embodiment of the invention.

FIG. 4 shows a schematic cross-sectional view of a cross-section through the region of the cell housing wall 20 in the region of the degassing opening 30. In particular, a section perpendicular to the y-direction is shown here. The housing wall 20 has an edge region 20a on the underside 22 which surrounds and adjoins the degassing opening 30. In this example, the closure element 24 is arranged on the outside of the housing wall 20, i.e. on the underside 22. The closure element 24 is arranged in such a way that it completely covers the degassing opening 30 and extends beyond it in the x-direction and y-direction and thus also covers the edge region 20a. The closure element 24 is arranged and fastened on the cell housing wall 20 in this edge region 20a. In the present case, the fastening takes place by means of a weld seam 36. This is also shown in cross-section in FIG. 4 and schematically in a plan view of the underside 22 in FIG. 1, wherein this weld seam 36 is indicated by the dashed line in FIG. 1. The weld seam 36 completely encloses the degassing opening 30 in this case.

Due to constant mechanical stress on this connection 36, small cracks can occur in this weld seam 36 or in general in such a connection point under certain circumstances. With conventional arrangements of cells in a motor vehicle, according to which the degassing openings are typically directed upwards, this is not a problem with regard to the ingress of liquid, since, in such a case, almost the entire battery housing would have to fill up with liquid, so that the degassing opening with the corresponding bursting element is also under water. In the preferred arrangement of the degassing element, which is referred to here as the closure element 24, according to which it points downwards or is arranged on an underside 22 of the cell 10, even a small amount of liquid that penetrates into the battery housing would be sufficient for this closure element 24 to also be under water. In order to offer more safety with regard to the penetration of liquid into the cell 10, the cell housing element 12a now advantageously also comprises a seal 40, which is also arranged along a closed line completely surrounding the degassing opening 30 in the edge region 20a, in particular radially within the weld seam 36 in relation to a center or central axis M of the bursting membrane 26. It extends, for example, through a center of the bursting membrane 26 and is aligned parallel to the z-direction. This seal 40 can be formed, for example as an O-ring, but it is formed here with a rectangular instead of circular geometry. This seal 40 accordingly advantageously seals the closure element 24 from the cell housing wall 20. Especially with the arrangement of the degassing opening 30 on the underside, significantly more safety can be offered as a result.

In the present example, in the region 20a of the housing wall 20 in which the seal 40 is also arranged, there is a groove or recess 43 on the underside 22 that completely surrounds degassing opening 30, in which recess the seal 40 is at least partially arranged, in particular recessed with respect to the z-direction. As a result, a gap can be reduced in the z-direction between the cell housing wall 20 and the closure element 24 in the edge region 20a.

Furthermore, in this example, the closure element 24 is designed in such a way that the bursting membrane 26 is arranged in the degassing opening 30 in a recessed manner. For this purpose, the closure element 24 can have, for example, a support flange region 42 which is arranged on the edge region 20a of the housing wall 20 and which has an edge 42a facing the degassing opening 30 and delimiting this flange region 42 in the x-direction, so to speak. This limitation is shown here as a dashed line in FIG. 4. Arranged on this edge 42*a* is a collar 44 protruding from the support flange region 42 and protruding into the degassing opening 30, which collar has an end face 44*a* facing away from the support flange region, which end face is again shown in dashed lines in FIG. 4. The bursting membrane 26 is now arranged on this end face. This end face can also be designed with a weakened material 26*a* to provide a predetermined breaking point. In the present case, this is in the middle, that is to say in the region of the central axis M of the bursting membrane 26, but it can in principle also be formed at any other point. The division of the closure element 24 into the sections mentioned, namely the support flange region 42, the collar 44, and the bursting membrane 26, is mainly used to better describe the geometry. In principle, it is conceivable to provide such a geometry, for example, only by embossing or shaping an originally flat bursting membrane foil. However, the closure element 24 can also be assembled from separate parts. The closure element 24 can, for example, have a wall thickness in the flange region 42 and in the collar region 44 which is similar to that in the region of the bursting membrane 26, apart from the predetermined breaking point 26*a*, or the bursting membrane 26 can also be thinner than the other areas of the closure element 24. The design with a similar or the same thickness in turn simplifies the production of the closure element 24. Furthermore, the closure element 24, which provides a vent element, can also have a thin plastic part 46, which is an example of a membrane protection element and which serves to protect the bursting membrane 26 from indentations. This plastic part 46 can be designed with a geometry that corresponds to the degassing opening 30, just slightly smaller, and can be clipped in correspondingly in the region inside the collar 44 or arranged differently from the rest of the closure element 24. The bursting membrane 26 and also the other components of the closure element 24, except for the membrane protection element 46, which is preferably made of plastic, are preferably made of a metallic material, preferably aluminum.

The seal 40 can be arranged together with the closure element 24 on the outer side of the cell wall 20, as shown in FIG. 4, or similarly also on an inner side 48, which is opposite the underside 22, so to speak. In this case, the seal 40 is then preferably not recessed into a groove 43, since the introduction of the groove 43 on the inside 48 would be difficult due to the cramped installation space situation. It would then also be preferable not to implement the connection between the closure element 24 and the wall 20 as a welded connection 36 but instead, for example, as an embossing or gluing or the like, since this would, in turn, simplify production. In this case, the plastic part 46 could also be dispensed with, since it would not offer any additional special protection on the inside, and the membrane 26 would be arranged with the remaining parts of the closure element 24 on the inside and thus in a better-protected position anyway. The membrane 26 in this case would not have to be set back from the support flange region 42, for example, and the collar 44 could also optionally be omitted in this case.

The closure element 24, which provides the bursting element or the vent element, can be produced and provided separately. The cell housing wall 20 of the cell housing element can also be provided separately accordingly. This cell housing wall 20 is opened downwards through a cutout, as a result of which the degassing opening 30 is provided, and then the vent element 24 with the bursting membrane 26 can be placed on this opening 30 and welded all around. The circumferential seal 40 described is located between the housing, i.e. the cell housing wall 20, and the vent element, i.e. the closure element 24.

Overall, the examples show how the invention can be used to provide a seal in prismatic cells with the vent pointing downwards. Such an additional seal on the vent element makes the interface and the cell as such more robust in cases where liquid penetrates the battery and the cell may be in a liquid such as coolant or water or salt water for a longer period of time. A more robust interface on the vent element not only helps meet the requirement of immersion testing, but also reduces the likelihood that the bursting membrane will be partially or fully collapsed prior to installation due to production or logistics errors. Such a seal is especially useful when the vent opening points downward.

The invention claimed is:

1. A cell housing element for a battery cell of a motor vehicle battery, comprising:
   a cell housing wall in which a degassing opening is arranged, which penetrates the cell housing wall,
   a closure element with a bursting membrane, which closure element is arranged on the cell housing wall completely covering the degassing opening, wherein the closure element comprises a support flange and a collar, the collar connecting the bursting membrane and the support flange, wherein the bursting membrane is formed from a same material as the support flange and the collar,
   wherein the cell housing element has a seal which is arranged between the closure element and the cell housing wall, circumferentially around the degassing opening.

2. The cell housing element of claim 1, wherein the cell housing element has a connector which connects the closure element to the cell housing wall along a closed connecting contour, which is arranged surrounding the degassing opening and surrounding the seal.

3. The cell housing element of claim 2, wherein the connector represents a weld seam.

4. The cell housing element of claim 3, wherein the cell housing element is designed to enclose an interior space, wherein the closure element is arranged on a side of the cell housing wall facing away from the interior space.

5. The cell housing element of claim 3, wherein the cell housing element is designed as a hollow profile, said hollow profile comprising a single-piece construction between a first end face and a second end face.

6. The cell housing element of claim 3, wherein a groove surrounding the degassing opening is arranged in the cell housing wall, in which groove the seal is recessed.

7. The cell housing element of claim 2, wherein the cell housing element is designed to enclose an interior space, wherein the closure element is arranged on a side of the cell housing wall facing away from the interior space.

8. The cell housing element of claim 2, wherein the cell housing element is designed as a hollow profile, said hollow profile comprising a single-piece construction between a first end face and a second end face.

9. The cell housing element of claim 2, wherein a groove surrounding the degassing opening is arranged in the cell housing wall, in which groove the seal is recessed.

10. The cell housing element of claim 1, wherein the cell housing element is designed to enclose an interior space, wherein the closure element is arranged on a side of the cell housing wall facing away from the interior space.

11. The cell housing element of claim 1, wherein the cell housing element is designed to enclose an interior space, wherein the closure element is arranged on a side of the cell housing wall facing the interior space.

12. The cell housing element of claim 11, wherein the cell housing element is designed as a hollow profile, said hollow profile comprising a single-piece construction between a first end face and a second end face.

13. The cell housing element of claim 11, wherein a groove surrounding the degassing opening is arranged in the cell housing wall, in which groove the seal is recessed.

14. The cell housing element of claim 10, wherein the cell housing element is designed as a hollow profile, said hollow profile comprising a single-piece construction between a first end face and a second end face.

15. The cell housing element of claim 10, wherein a groove surrounding the degassing opening is arranged in the cell housing wall, in which groove the seal is recessed.

16. The cell housing element of claim 1, wherein the cell housing element is designed as a hollow profile, said hollow profile comprising a single-piece construction between a first end face and a second end face.

17. The cell housing element of claim 1, wherein a groove surrounding the degassing opening is arranged in the cell housing wall, in which groove the seal is recessed.

18. The cell housing element of claim 1, wherein the support flange of the closure element is arranged in an edge region surrounding the degassing opening on a first side of the cell housing wall and has an edge facing the degassing opening, wherein the collar is arranged on the edge, wherein the collar has an end face that faces away from the support flange region, on which end face the bursting membrane is arranged, wherein the closure element has a membrane protection element which is arranged on the collar in front of the bursting membrane in a first direction and at a distance from the bursting membrane in the first direction.

19. A motor vehicle with a battery cell which has a cell housing with a cell housing element of claim 1, wherein the battery cell is arranged in the motor vehicle in such a way that the closure element is arranged on an underside of the battery cell with respect to a vehicle vertical axis.

20. A method for producing a cell housing element for a battery cell of a motor vehicle battery, comprising the steps:
- providing a cell housing wall in which a degassing opening is arranged, which penetrates the cell housing wall;
- providing a closure element with a bursting membrane, wherein the closure element comprises a support flange and a collar, the collar connecting the bursting membrane and the support flange, wherein the bursting membrane is formed from a same material as the support flange and the collar;
- arranging the closure element on the cell housing wall in such a way that the closure element completely covers the degassing opening;
- wherein a seal is arranged between the closure element and the cell housing wall, circumferentially surrounding the degassing opening.

* * * * *